United States Patent
Delaplace et al.

(10) Patent No.: US 8,083,178 B2
(45) Date of Patent: Dec. 27, 2011

(54) METHOD AND DEVICE FOR PILOTING AN AIRCRAFT OPTIMIZING THE CONTROL OF THE AILERONS IN AN ENHANCED-LIFT CONFIGURATION

(75) Inventors: Franck Delaplace, Toulouse (FR); Sophie Lambeaux, Tournefeuille (FR); Frédéric Sauvinet, Tournefeuille (FR)

(73) Assignee: Airbus Operations SAS, Toulouse (FR)

( * ) Notice: Subject to any disclaimer, the term of this patent is extended or adjusted under 35 U.S.C. 154(b) by 666 days.

(21) Appl. No.: 12/294,588

(22) PCT Filed: May 21, 2007

(86) PCT No.: PCT/FR2007/000851
§ 371 (c)(1),
(2), (4) Date: Sep. 25, 2008

(87) PCT Pub. No.: WO2007/138179
PCT Pub. Date: Dec. 6, 2007

(65) Prior Publication Data
US 2009/0230253 A1    Sep. 17, 2009

(30) Foreign Application Priority Data
May 29, 2006 (FR) .................................. 06 04721

(51) Int. Cl.
*B64C 13/16* (2006.01)
*B64C 5/08* (2006.01)
(52) U.S. Cl. ..................................... 244/90 R; 244/195

(58) Field of Classification Search ................. 244/34 R, 244/35 R, 215, 219, 90 R, 191, 194–195; 701/3, 7
See application file for complete search history.

(56) References Cited

U.S. PATENT DOCUMENTS

| | | | |
|---|---|---|---|
| 2,210,642 A * | 8/1940 | Thompson | 244/35 R |
| 2,407,401 A | 9/1946 | Clauser | |
| 3,734,432 A * | 5/1973 | Low | 244/191 |
| 4,455,004 A * | 6/1984 | Whitaker, Sr. | 244/90 R |
| 4,479,620 A * | 10/1984 | Rogers et al. | 244/195 |
| 4,705,236 A | 11/1987 | Rudolph | |
| 6,970,773 B2 * | 11/2005 | Phillips | 701/7 |
| 7,243,881 B2 * | 7/2007 | Sakurai et al. | 244/212 |
| 7,494,094 B2 * | 2/2009 | Good et al. | 244/215 |

FOREIGN PATENT DOCUMENTS

| | | |
|---|---|---|
| EP | 0 075 966 | 4/1983 |
| FR | 2 425 379 | 12/1979 |

OTHER PUBLICATIONS

International Search Report dated Sep. 6, 2007 w/ English translation.
Written Opinion of the International Searching Authority with English translation.

* cited by examiner

*Primary Examiner* — Galen Barefoot
(74) *Attorney, Agent, or Firm* — Dickinson Wright PLLC

(57) ABSTRACT

In conformance with the invention, based on the incident conditions and velocity, the steering of the ailerons is weakly negative (b0) or corresponds either to the maximum sharpness of the aircraft (b1), or the optimal lift of the latter (b2).

9 Claims, 3 Drawing Sheets

METHOD AND DEVICE FOR PILOTING AN AIRCRAFT OPTIMIZING THE CONTROL OF THE AILERONS IN AN ENHANCED-LIFT CONFIGURATION

The present invention relates to a piloting method and device for aircraft making it possible to optimize the control of the ailerons in an enhanced-lift configuration.

It is known that, among other movable aerodynamic surfaces, the two symmetric wings of an aircraft can comprise leading edge slats and/or trailing edge flaps able when they are deployed to generate the enhanced lift of said wings, and also ailerons to control said aircraft in terms of roll. In an enhanced-lift configuration such as this, the ailerons are customarily deflected downwards so as to take a compensated neutral position, participating in the overall lift-enhancement of the aircraft.

However, from a compensated neutral position such as this, the roll effectiveness of said ailerons is relatively low, so that the roll performance of the aircraft is heavily degraded. Moreover, as a result of this low roll effectiveness, the aircraft exhibits a reduced margin with respect to the phenomenon of pilot-induced oscillation.

The object of the present invention is to remedy these drawbacks.

To this end, according to the invention, the method of piloting an aircraft comprising two symmetric wings provided:

with movable lift-enhancing aerodynamic surfaces, able to afford said wings either a smooth configuration, or at least one enhanced-lift configuration; and with roll control ailerons, whose neutral position corresponds to a zero deflection, when said wings exhibit said smooth configuration, is noteworthy in that, in the enhanced-lift configuration of said wings, said ailerons are afforded, in an identical manner on the two wings and disregarding a possible roll control order:

when the incidence and the speed of the aircraft are respectively less than an incidence threshold and greater than a speed threshold, a first state corresponding to a position deflected upwards by an angle, for example at the most equal to 5°, such that said ailerons preserve their roll effectiveness almost intact; and when the incidence of the aircraft is equal to or greater than said incidence threshold or when the speed of the aircraft is equal to or less than said speed threshold, a second state corresponding:

either to a first downward deflection of value corresponding at least approximately to the maximum finesse of the aircraft, if the latter is in the takeoff or re-takeoff phase, or to a second downward deflection of value corresponding at least approximately to the optimal lift of the aircraft, if the latter is in the landing phase.

Thus, by virtue of the present invention, when the aircraft is in an enhanced-lift configuration, three deflected positions rather than just one are now communicated to said ailerons:

when the aircraft is in the landing approach or at the end of takeoff, the upward deflection of the ailerons is sufficiently small for said ailerons to exhibit excellent roll effectiveness. Moreover, in this position, the ailerons not only generate little noise, but also combat the wake vortices by generating a local vortex which, associated with the other vortices generated by the airplane, favors the progressive dissipation of said wake vortices;

when the aircraft lands, the deflection of the ailerons corresponds to the maximum lift, that is to say to the lowest stall speed, and therefore to the lowest landing speed, this constituting optimal landing conditions. Moreover, in the landing phase, the deflection of the ailerons generates a maximum drag, thereby favoring the deceleration of the aircraft; and when the aircraft begins a takeoff, the deflection of the ailerons affords it good lift and not too high a drag (the finesse corresponding to the ratio of the lift to the drag), thus helping the aircraft to take off.

Preferably, in order to add dynamism to the switch from one state to another, it is advantageous, on the one hand, to determine the position of the incidence $\alpha$ with respect to said incidence threshold $\alpha s$ by comparing the expression $\alpha + K1 \cdot q$ with said threshold $\alpha s$, $K1$ being a positive constant coefficient and $q$ being the pitch rate of said aircraft (that is to say the derivative with respect to time of said incidence $\alpha$), and, on the other hand, to determine the position of the speed $Vc$ of the aircraft with respect to said speed threshold $Vs$ by comparing the expression $Vc + K2 \cdot dVc/dt$ with said threshold $Vs$, $K2$ being a positive constant coefficient and $dVc/dt$ the acceleration of said airplane.

The value of said incidence and speed thresholds depends on the lift-enhancing position of said lift-enhancing aerodynamic surfaces and the Mach number.

The switching of the ailerons from one state to another can be reversible or irreversible. For example, after being switched from said first state to the second, said ailerons remain in said second state even if the incidence and speed conditions again become in accordance with said first state. On the other hand, after being switched from said first state to the second, said ailerons can switch back, preferably with hysteresis, to said first state when the incidence and speed conditions again become in accordance with said first state.

For the implementation of the method in accordance with the present invention, it is possible to use a device mounted aboard said aircraft and comprising:

first comparison means for comparing said incidence $\alpha$ with said incidence threshold $\alpha s$;

second comparison means for comparing said speed $Vc$ with said speed threshold $Vs$;

logic means of OR type receiving the results of the comparisons performed by said first and second comparison means;

first switching means for choosing between said first deflection and said second deflection; and second switching means, actuated by said logic means for choosing between the result of the choice of said first switching means and said position deflected upwards by an angle such that said ailerons preserve their roll effectiveness almost intact.

The figures of the appended drawing will elucidate the manner in which the invention can be carried out. In these figures, identical references designate similar elements.

Figure 1:
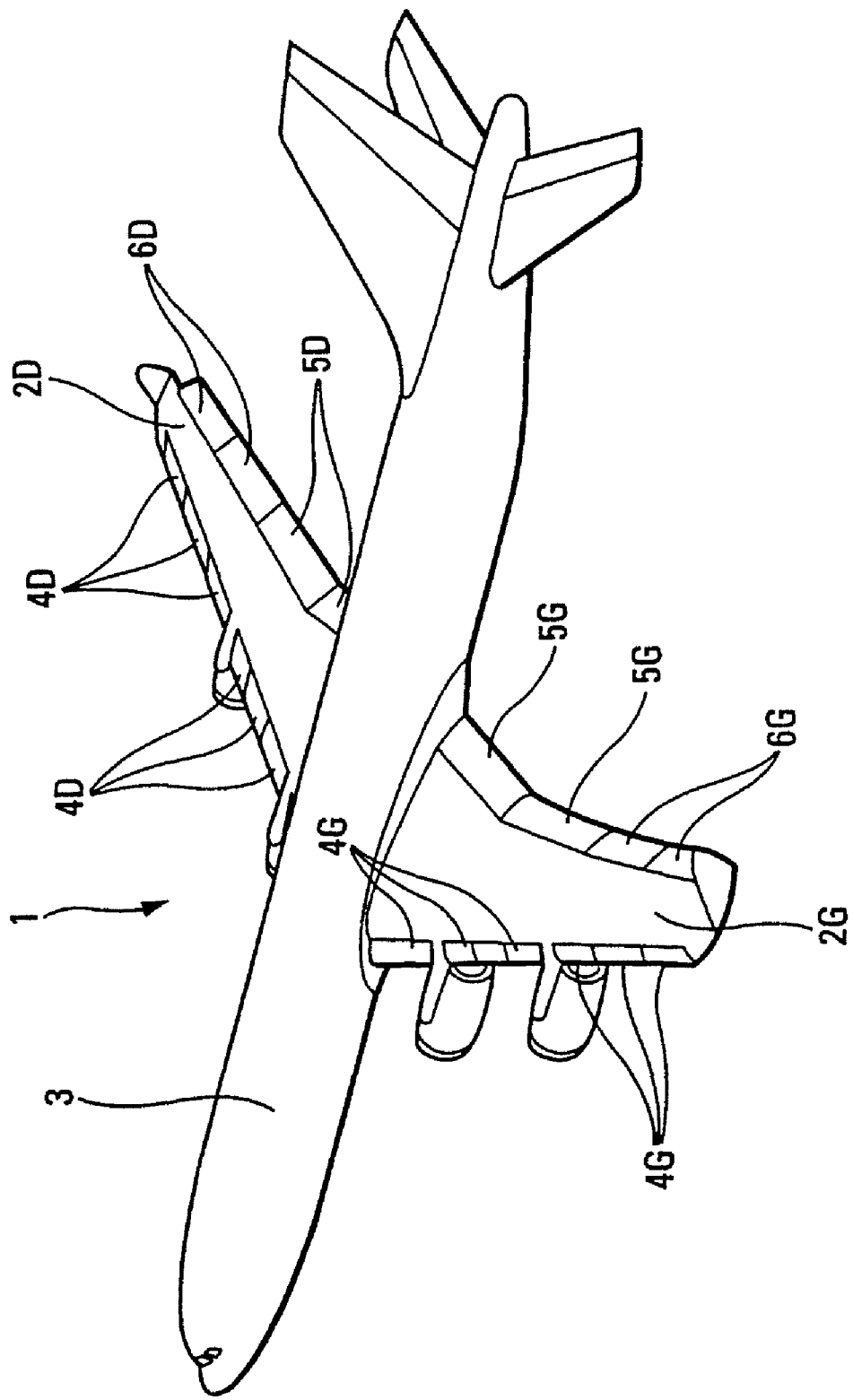
FIG. 1 shows in schematic perspective a wide-bodied civil airplane provided with slats and lift-enhancing flaps, and also with ailerons.

The civil transport airplane 1, schematically represented in perspective in FIG. 1, comprises two wings 2G and 2D in all respects symmetric with one another with respect to the fuselage 3.

The wings 2G and 2D respectively comprise leading edge slats 4G, 4D, trailing edge flaps 5G, 5D (said slats and flaps constituting lift-enhancing aerodynamic surfaces for the airplane 1) and roll control ailerons 6G, 6D.

In a customary manner, the slats and the flaps 4G, 4D; 5G, 5D are deployable and retractable so as to communicate to the wings 2G, 2D, and therefore to the airplane 1, a smooth configuration when they are retracted and at least one enhanced-lift configuration when they are deployed.

Likewise, the ailerons 6G, 6D are articulated in rotation on said wings 2G, 2D so as to be able to take various deflection positions with respect to the latter.

Figure 2:
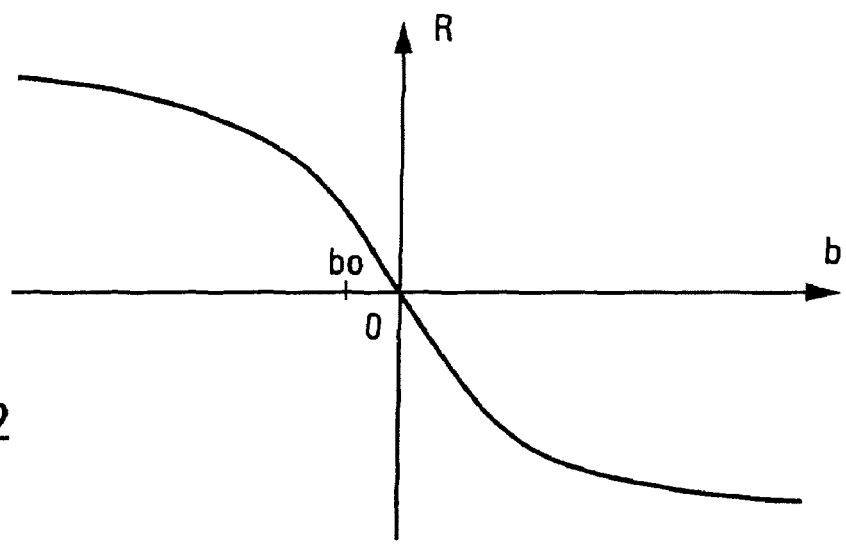
FIGS. 2, 3 and 4 are charts illustrating respectively the roll effectiveness, the finesse and the lift of the airplane of FIG. 1 as a function of the angle of deflection of the ailerons.

Represented in FIG. 2 is a known chart illustrating the roll effectiveness R of the ailerons 6G, 6D on the airplane 1 as a function of the angle of deflection b of said ailerons. On this chart, positive angles b correspond to a downward deflection and negative angles b to an upward deflection. From this known chart, it is readily noted that the roll effectiveness R of said ailerons is good so long as the angle of deflection b takes a value close to zero. Thus, for a negative value b0 close to zero, for example at most equal to $-5°$, the roll effectiveness of the ailerons is practically as good as when the angle of deflection is zero.

Figure 3:
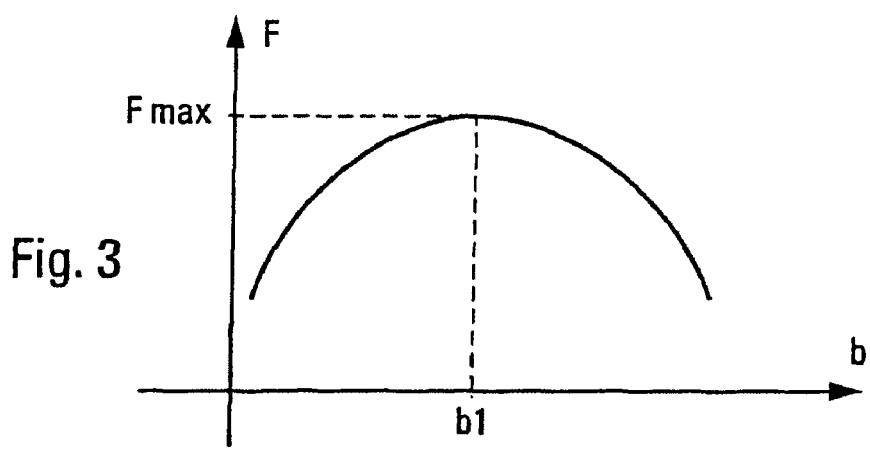

Moreover, represented in FIG. 3 is another known chart illustrating the finesse F of the airplane 1, that is to say the ratio of its lift to its drag, as a function of said angle of deflection b of the ailerons 6G, 6D. It may be seen there that said finesse passes through a maximum Fmax for a positive value b1 of said angle of deflection b.

Figure 4:
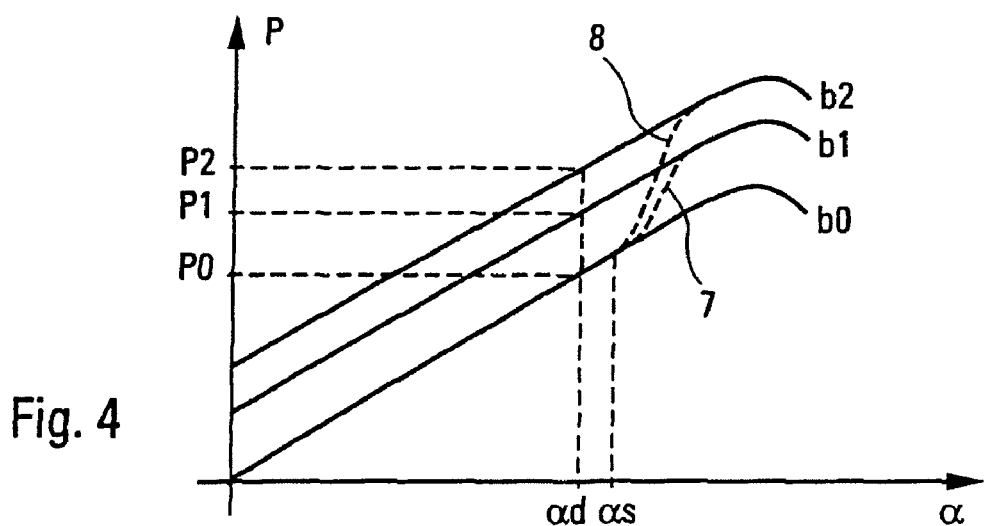

Finally, represented in FIG. 4 is a third known chart illustrating the lift P of the airplane 1 as a function of its incidence $\alpha$, for the negative value b0 and the positive values b1 and b2 (with b2>b1) of the angle of deflection b of the ailerons 6G, 6D. The latter chart illustrates that, for a determined value $\alpha d$ of $\alpha$, the corresponding value P0, P1 or P2 of the lift P is all the larger the larger the value of the angle of deflection b.

The present invention is described hereinafter with regard to the schematic diagram of FIG. 5, supported by the characteristics illustrated by FIGS. 2, 3 and 4.

Figure 5:
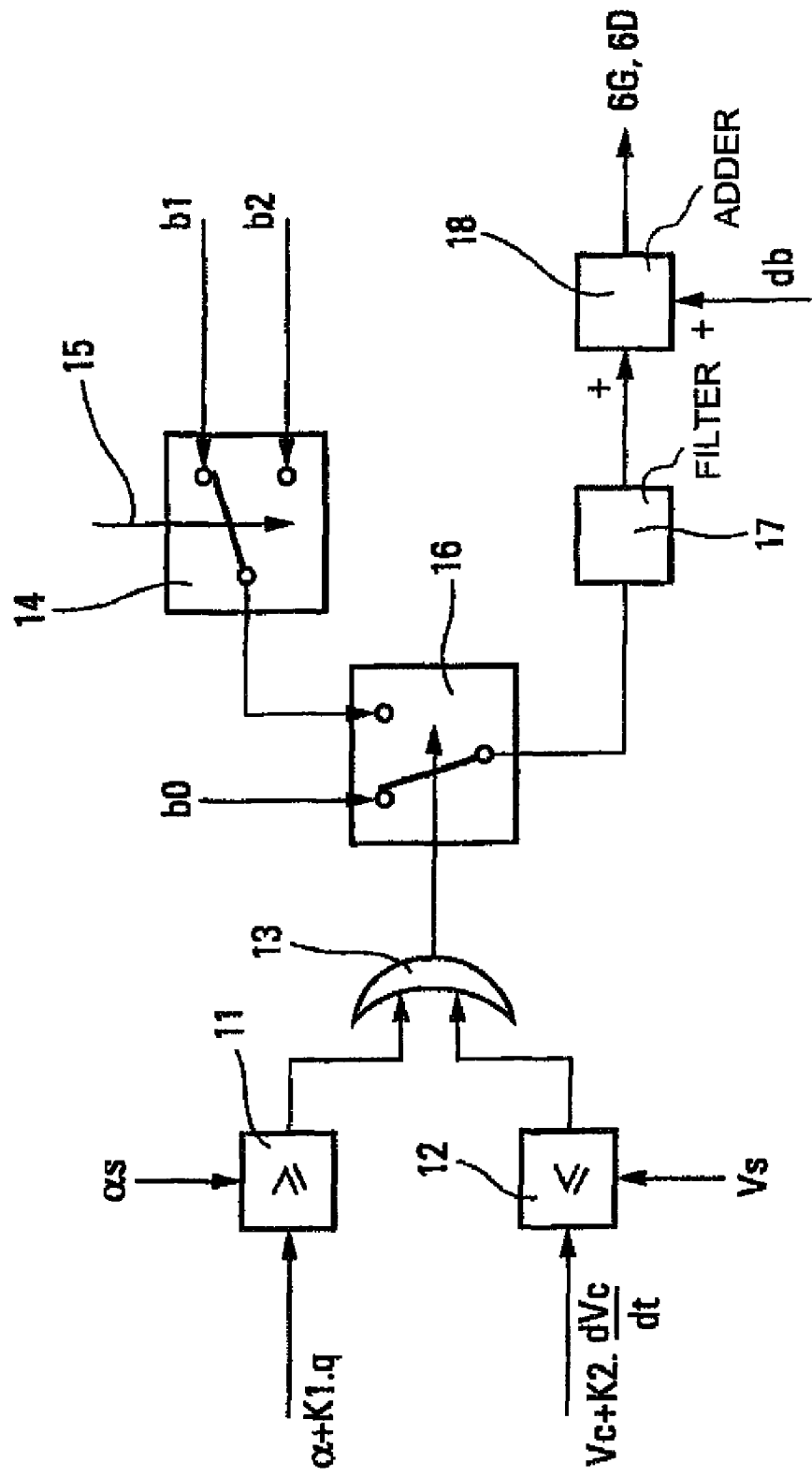
FIG. 5 is the schematic diagram of a device for implementing the method in accordance with the present invention.

The device intended to implement the method according to the invention and represented by the schematic diagram of FIG. 5 comprises:
- a first comparator 11 receiving, on one of its inputs, the sum of the current incidence $\alpha$ of the airplane 1 and of a term $K1 \cdot q$, consisting of the product of a positive constant K1 and of the current pitch rate q of said airplane and, on its other input, an incidence threshold $\alpha s$, whose value is dependent on the position of the slats 4G, 4D, the flaps 5G, SD and the Mach number, said first comparator 11 delivering a signal only when the expression $\alpha+K1 \cdot q$ is equal to or greater than $\alpha s$;
- a second comparator 12 receiving, on one of its inputs, the sum of the current speed Vc of the airplane 1 and of a term $K2 \cdot dVc/dt$, consisting of the product of a positive constant K2 and of the derivative $dVc/dt$ of the speed of said airplane and, on its other input, a speed threshold Vs, whose value is dependent on the position of the slats 4G, 4D, the flaps 5G, SD and the Mach number, said second comparator 12 delivering a signal only when the expression $Vc+K2 \cdot dVc/dt$ is equal to or less than Vs;
- a logic gate 13, of OR type, whose inputs are respectively linked to the outputs of the comparators 11 and 12;
- a first switch 14 receiving respectively at its inputs the two positive values b1 and b2 of the angle of deflection b, corresponding respectively to the maximum finesse Fmax and to the optimal lift P2 for the aircraft 1, said switch 14 addressing one or the other of these values b1 or b2 to its output in response to an order 15 corresponding respectively to the fact that the airplane 1 is in the takeoff phase (or re-takeoff phase) or in the landing phase;
- a second switch 16 receiving respectively on its two inputs the negative value b0 and one or the other of the positive values b1 or b2 (as a function of the command 15 of the first switch 14), said second switch 16 being commanded by the output of the logic gate 13 to address either the negative value b0, or one or the other of the positive values b1, b2 to a filter 17; and
- an adder 18 making it possible to add to a piloting order db for the ailerons 6G, 6D, one or the other of the values b0, b1 or b2.

In the light of the schematic diagram of FIG. 1, it is readily understood that, in the enhanced-lift configuration of the wings 2G, 2D:
- when the expression $\alpha+K1 \cdot q$ is less than the incidence threshold as and the expression $Vc+K2 \cdot dVc/dt$ is greater than the speed threshold Vs, the logic gate 13 does not deliver any signal, so that the negative deflection b0 is imposed in common on the ailerons 6G, 6D, through the filter 17 and after possible addition of a roll control order db. From what is shown by the chart of FIG. 2, and from the associated comments, it will be understood that the low negative deflection b0 allows possible effective roll control; and
- when the expression $\alpha+K1 \cdot q$ is equal to or greater than the incidence threshold as or the expression $Vc+K2 \cdot dVc/dt$ is equal to or less than the speed threshold Vs, the logic gate 13 toggles the second switch 16, so that the positive deflection b1 corresponding to takeoff or the positive deflection b2 corresponding to landing (as a function of the state of the first switch 15) is imposed in common on the ailerons 6G, 6D, through the filter 17 and after possible addition of a roll control order db. The deflections b1 and b2 can be respectively of the order of 5° and 10°.

Represented by dashed lines 7 and 8 respectively in FIG. 4 is the switchover from the deflection b0, on the one hand, to the deflection b1 or b2, on the other hand, when said second switch 16 toggles.

It will be noted that, by virtue of the action of the filter 17, the switchover from the deflection b0 to the deflection b1 or b2 occurs gently, with no jerkiness.

The second switch 16 can be monostable and return spontaneously to its initial position corresponding to the deflection b0, as soon as the logic gate 13 no longer addresses any signal to it. As a variant, the second switch 16 can be bistable and remain in its toggled position corresponding to the deflection b1 or b2, even if the logic gate 13 no longer addresses any signal to it.

The invention claimed is:

1. A method for piloting an aircraft, in which the aircraft comprises two symmetric wings, with each wing having:
   movable lift-enhancing aerodynamic surfaces, configured to provide said wings either a smooth configuration, or at least one enhanced-lift configuration; and
   roll control ailerons, configured to provide a neutral position that corresponds to a zero deflection, when said wings exhibit said smooth configuration,
   the method comprising the steps of:
   providing the enhanced-lift configuration to said wings:
   when incidence and speed of the aircraft are respectively less than an incidence threshold and greater than a speed threshold, a first state corresponding to a position deflected upwards by an angle such that roll effectiveness of said ailerons is preserved; and when incidence of the aircraft is equal to or greater than said incidence threshold or when the speed of the aircraft is equal to or less than said speed threshold, a second state corresponding to at least one of:
a first downward deflection value corresponding to maximum finesse (Fmax) of the aircraft during takeoff or re-takeoff phase, and
a second downward deflection value corresponding to optimal lift of the aircraft during landing phase.

2. The method as claimed in claim 1, wherein the position of the incidence $\alpha$ with respect to said incidence threshold as is determined by comparing the expression $\alpha+K1\cdot q$ with said threshold $\alpha s$, $K1$ being a positive constant coefficient and $q$ being the pitch rate of said aircraft.

3. The method as claimed in claim 2, wherein said incidence threshold as depends on the position of said lift-enhancing aerodynamic surfaces and the Mach number.

4. The method as claimed in claim 1, wherein the position of the speed Vc of the aircraft with respect to said speed threshold Vs is determined by comparing the expression $Vc+K2\cdot dVc/dt$ with said threshold Vs, $K2$ being a positive constant coefficient and $dVc/dt$ the acceleration of said airplane.

5. The method as claimed in claim 4, wherein said speed threshold (Vs) depends on the position of said lift-enhancing aerodynamic surfaces and the Mach number.

6. The method as claimed in claim 1, wherein, after being switched from said first state to the second, said ailerons remain in said second state even if the incidence and speed conditions again become in accordance with said first state.

7. The method as claimed in claim 1, wherein, after being switched from said first state to the second, said ailerons switch back to said first state when the incidence and speed conditions again become in accordance with said first state.

8. A device for implementing the method of claim 1, the device comprising:
first comparator that compares said incidence $\alpha$ with said incidence threshold $\alpha s$;
second comparator that compares said speed Vc with said speed threshold Vs;
OR type logic gate that receives results of the comparisons performed by said first and second comparators;
first switching unit that chooses between said first deflection and said second deflection; and
second switching unit, actuated by said logic unit that chooses between results the first switching unit and said position deflected upwards by an angle such that said ailerons preserve roll effectiveness.

9. An aircraft, comprising a device that implements the method of claim 1.

* * * * *